United States Patent [19]

Silver

[11] 3,730,624
[45] May 1, 1973

[54] METHOD OF MAKING A MATRIX OF PHOTOGRAPHS FROM A FILM STRIP

[75] Inventor: Julian Silver, White Plains, N.Y.
[73] Assignee: U. S. Dynamics Inc., Elmsford, N.Y.
[22] Filed: Apr. 26, 1971
[21] Appl. No.: 137,270

[52] U.S. Cl. .................. 355/132, 355/54, 355/77
[51] Int. Cl. ............................................. G03b 27/02
[58] Field of Search ................... 355/132, 54, 77, 355/122, 104

[56] References Cited

UNITED STATES PATENTS 2,195,936  4/1940  Perkins et al. .................. 355/132
3,289,530  12/1966  Samain ............................ 355/77 X Primary Examiner—Richard L. Moses
Attorney—Ralph L. Thomas and Thomas & Thomas

[57] ABSTRACT

A method of making a rectangular matrix from a film strip having photographic frames with image areas includes the steps of exposing a series of image areas on frames of a film strip, leaving blank frames at predetermined locations on the film strip, processing the film strip to produce image transparencies thereon, winding the film strip around a cylinder to form adjacent convolutions with the blank areas aligned, securing the blank areas together, and cutting the film strip on the cylinder through all of the blank areas at an angle approximately of 90° with respect to the longitudinal axis of the film strip thereby to produce a rectangular matrix of photographic frames with image areas thereon, termed as a fiche. The resulting matrix, plus an indicia bearing document, may be photographed to produce a photographic transparency or fiche copy.

18 Claims, 12 Drawing Figures

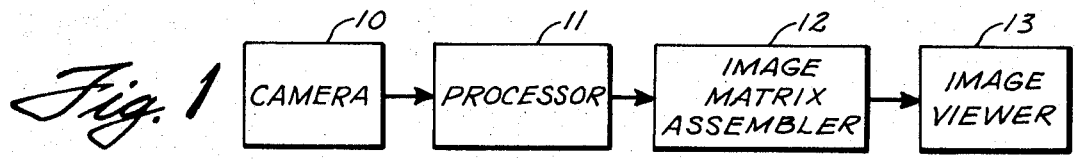
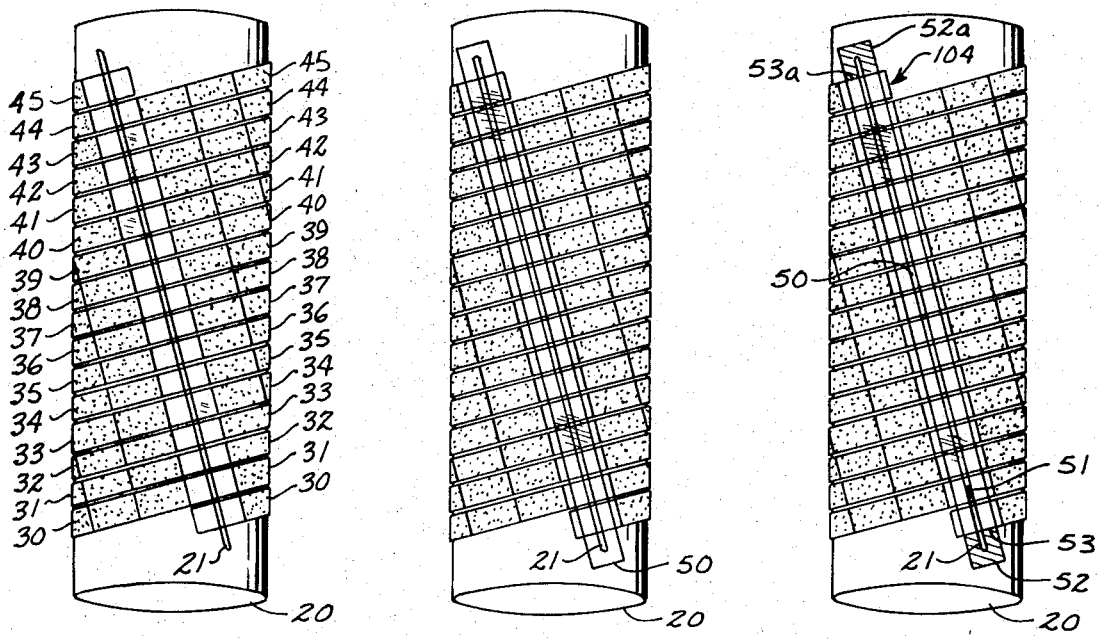
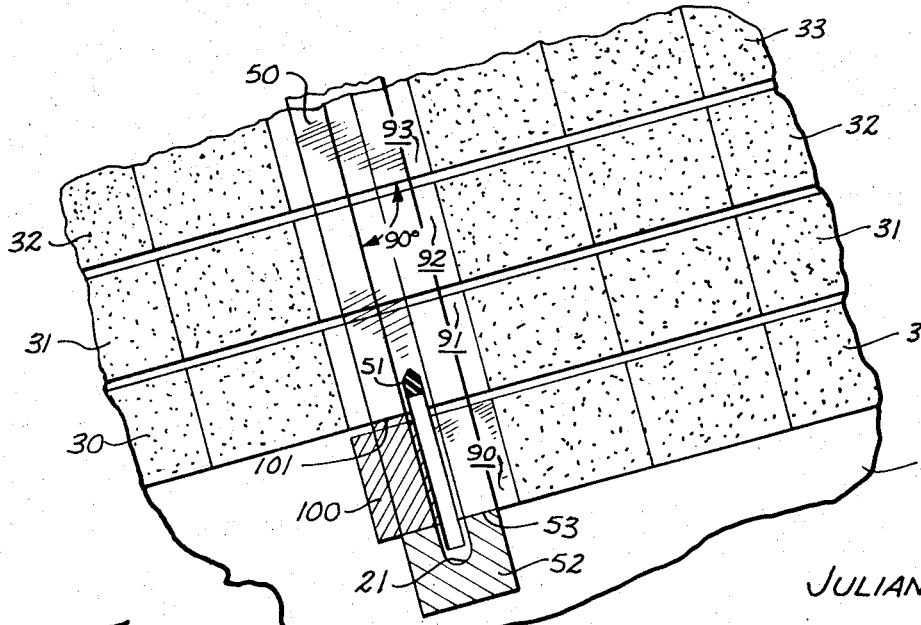

METHOD OF MAKING A MATRIX OF PHOTOGRAPHS FROM A FILM STRIP

CROSS-REFERENCE TO RELATED APPLICATION

Application, Ser. No. 56,393 now U.S. Pat. No. 3690762 filed by Julian Silver on July 20, 1970 for Micro-Film Apparatus and Method.

BACKGROUND OF THE INVENTION

This invention relates to photography and more particularly to a method for making a rectangular matrix of photographic frames from a film strip of photographic frames, Some microfilm systems store reels on which are wound a strip film having photographic frames. Other microfilm systems store rectangular cards on which photographic frames are disposed in a matrix array having columns and rows of photographic frames. For some applications a card or fiche is more desirable for ease of access than a spool or reel of strip film. However, cards or fiches are relatively much more expensive than a corresponding length of strip film on a reel because more expensive equipment and more labor are required to produce them. To produce a fiche by one method requires the use of a complex and expensive special camera in which film several inches in width is employed. A plurality of microphotographs are disposed adjacent to one another across the width of the wide film. The camera is expensive because a complex arrangement is required to provide relative movement between the lens and film. Frames are exposed sequentially across the width of the film as successive photographs are made. When one horizontal row of photographs is made, the film is advanced one frame along the longitudinal axis of the wide film strip, and the process is repeated to expose a plurality of photographs on a second row across the width of the wide film. The intricate mechanisms of the complex camera require the services of a specially trained operator. This process may be repeated until all rows of the wide film are exposed, and the wide film then is developed. The developed film may be cut into longitudinal segments of a given length, and each such segment constitutes a card or fiche. Since the complex special camera is very expensive to manufacture and maintain and since the service of a highly skilled operator is required, thereby greatly increasing the labor cost, the resulting card or fiche is expensive to the point that it is justified only for relatively limited applications deemed critically important.

A less expensive technique for making a fiche involves the use of a roll of film which has a small width such as 8 millimeters, for example. The roll of film is exposed, developed, and cut into strips with each strip having a fixed number of photographic frames. Blank or unexposed frames are disposed at selected intervals in the film strip, and the film strip is cut at such blank spaces. The separate film strips are disposed adjacent to one another to form a rectangular array, and they are secured together by an adhesive material. One piece of adhesive tape is disposed at one end of the film strips to hold them in place, and a second piece of adhesive tape is placed for the like purpose at the other end of the film strips. The result is a fiche master, and a photographic transparency may be made from the fiche master. The copy is suitable for filing purposes. This method is cumbersome and tedious. A fiche made by this technique is expensive because of the high labor cost. However, a fiche made by this method is not as expensive as a fiche made by the first method described above. It is to the problem of further reducing the cost of making a fiche that the method of this invention is directed.

SUMMARY OF THE INVENTION

It is a feature of this invention to provide a novel method for making from a strip film a fiche which is relatively inexpensive.

It is a feature of this invention to provide a novel method of making a rectangular array of photographic frames from a film strip having a plurality of rectangular photographic frames disposed in series thereon.

It is another feature of this invention to provide a novel method for making a rectangular fiche from a film strip having a plurality of photographic frames disposed in series thereon by winding the film strip on a drum or cylinder with blank or unexposed areas aligned and cutting through such blank areas at an angle of approximately 90° with respect to the longitudinal edge of the film strip.

It is a feature of this invention to provide a novel method of making a rectangular fiche from a film strip on which rectangular photographic frames are disposed in series with blank frames appearing periodically by winding the film strip on a cylinder to produce successive convolutions the edges of which form a helix on the surface of the cylinder to form successive convolutions with the blank frames being aligned in a skewed fashion on the surface of the cylinder, placing an adhesive material over the blank frames, and cutting through the adhesive material and the film strip in a skewed direction on the cylinder at an angle approximately of 90° with respect to the longitudinal edge of each convolution of the film strip.

It is a further feature of this invention to provide a novel method for making a rectangular matrix of photographic frames which comprises the steps of: exposing a series of frames on a film strip, leaving blank or unexposed areas at predetermined locations on the film strip, processing the film strip to produce image transparencies thereon, winding the film strip on a cylinder with the blank or unexposed areas aligned in a skewed fashion on the surface of the cylinder, securing the blank areas together, and cutting the film strip through the blank areas at an angle of approximately 90° with respect to each convolute of the film strip, thereby to form a rectangular matrix of photographic frames.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 1 is a block diagram illustrating a system which incorporates the present invention.

FIGS. 2 through 4 illustrate several steps of the novel method according to this invention for forming a rectangular matrix array of photographic frames from a strip film.

FIG. 5 is an enlarged view of the lower righthand corner portion of FIG. 4.

DESCRIPTION OF THE PREFERRED EMBODIMENT

Figure 6:
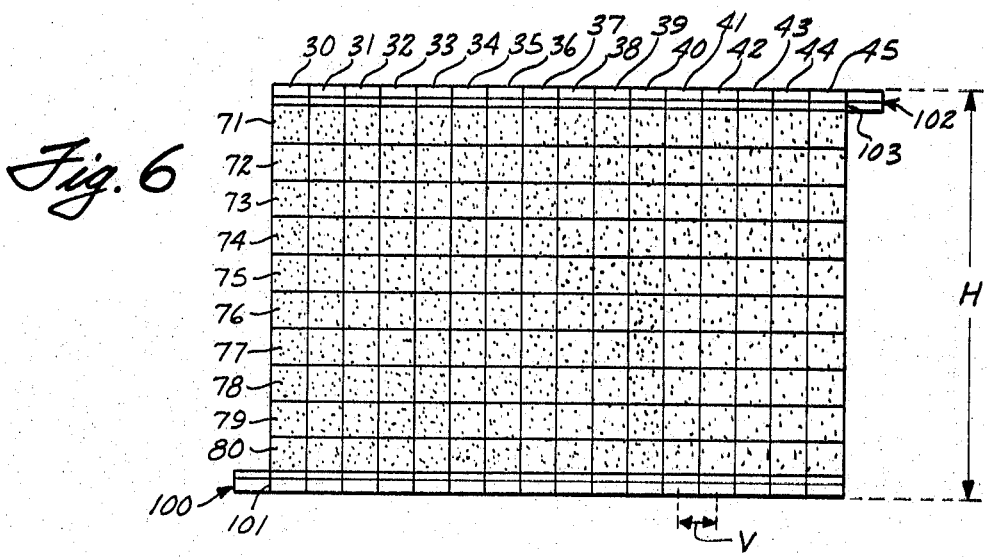
FIG. 6 illustrates the resulting rectangular matrix array of photographic frames disposed in columns and rows.

Referring first to FIG. 1, a system is illustrated in block form which incorporates the method according to this invention. As a matter of convenience the invention is described with reference to documents recorded on microfilm. It is to be understood, however, that the method of this invention may be practiced in photographic applications other than microfilming operations and in photographic applications other than the recording of documents. The ensuing description of a microfilming operation which records documents is by way of illustration and not limitation.

If the camera 10 in FIG. 1 is employed to photograph documents, letter size or legal size, it may use a Super 8 cartridge having a film strip which is 8 millimeters wide. A given number of frames are exposed, and a given length of film is skipped without exposing it. In a preferred technique according to this invention 10 frames are exposed successively to record documents after which an unexposed area is skipped. The size of the unexposed area may be varied as desired. This area may be less than a frame, or it may be equal to one or more frames. In the preferred method according to this invention one frame is skipped after 10 frames are exposed. Each picture frame has a length of approximately 0.33 inches, and thus three frames can be recorded per inch of the film strip. For purposes of illustration each fiche or matrix array of frames ultimately provided is selected arbitrarily to have sixteen columns with each column having 10 frames exposed and one frame unexposed. Ten fiches or matrix arrays can be made from each cartridge of Super 8 film where the cartridge has 50 feet of strip film or a total of 600 inches in length. There are a total of 1,800 frames available on such a Super 8 cartridge. A total of 1,600 frames are exposed, and 160 frames are unexposed to provide separation between exposed groups of frames on the film strip. A total of 40 frames are not used per such cartridge of Super 8 strip film, and this portion of the film may be used for various incidental purposes. For example, some of this film may be used to permit advancing the film a given distance before commencing photographic operations thereby to insure that the first frame used to photograph a document is not exposed to ambient light during the loading operation. Also, a portion of the unused film may be employed at the end of the reel to permit advancing the last exposed frame to a position whereby it is not exposed to ambient light when the cartridge is removed.

After the frames of a cartridge have been exposed, the film may be developed by conventional techniques, and this is represented in FIG. 1 by the processor block 11. The processed film is supplied on a reel, and this film is ready for conversion to a fiche or a matrix array of frames having photographic images. It is pointed out that a frame may record a single document, or a frame may record several documents. The image matrix assembler 12 in FIG. 1 represents the conversion of processed strip film to a fiche or matrix array of photographic frames, and this process is described more fully herein below. Each frame of a fiche may be selectively viewed by an image viewer 13 in FIG. 1, and the image viewer may be any one of various commercial readers which are available. If the camera 10 in FIG. 1 uses a 42:1 reduction ratio, then the image viewer 13 preferably has a 42:1 magnification ratio so that the document in the selected frame may be viewed in its actual size. Next, the method of converting the processed strip film to a fiche or matrix array of photographic frames is described.

A roll of developed film strip is converted to a rectangular matrix array of frames in several steps. The first step is to wind the strip film on a cylinder 20 in FIG. 2. The cylinder 20 includes a slot 21 in its surface, and this slot runs with a constant skew around the surface of the cylinder as illustrated in FIG. 2. As the strip film is wound on the cylinder, it forms successive convolutions 30 through 45 on the cylinder 20, and the edges of these convolutions form a helix since they follow a helical pattern. Thus the contiguous convolutions of the strip film themselves form a cylinder which covers the outer surface of the cylinder 20. In short, as the strip film circumvolutes the cylinder 20 successive circumvolutions form a wrapping which covers the outer surface of the cylinder 20 except for a slight separation between the edges of one circumvolution and the edge of the next circumvolution.

The next step is to secure the blank frames of each convolution together. For this purpose a transparent or clear adhesive material may be used. One suitable such material readily available commercially is known by the brand name Scotch R transparent tape. A piece of transparent tape 50 is shown disposed on the blank frames over the slot 21 in FIG. 3.

The next step is to cut through the transparent tape 50 and the blank frames. For this purpose a knife 51 in FIG. 4 is inserted in the lower end of the slot 21, and it is forced along this slot to the upper end thereof in FIG. 4. The lower end of the transparent tape extending below the lowest blank frame and the upper end of the transparent tape extending above the uppermost blank frame are cut to permit removal from the cylinder 20 of the matrix array of photographic frames. This is illustrated in greater detail in FIG. 5, an enlarged view of the lower righthand corner portion of FIG. 4, where the lower crosshatched portion 52 of the tape 50 is cut along the upper edge 53 thereby to separate the tab portion 52 from the transparent frame 90. The tab portion 52 may be peeled from the surface of the cylinder 20. An upper tab 52a in FIG. 4 likewise is removed by cutting along the edge 53a and peeling the tab 52a from the surface of the cylinder 20. The matrix of photographic frames is then removed from the surface of the cylinder 20. If this matrix array is laid out flat, it is a rectangular matrix array as illustrated in FIG. 6 This matrix array has sixteen columns 30 through 45, and the matrix array has ten rows 71 through 80. It is pointed out that the matrix array of photographs in FIG. 6 is rectangular because each of the convolutions 30 through 45 in FIGS. 2 through 5 run perpendicular to the slot 21. When the convolutions are cut by the knife 51, the knife runs through the slot 21 and cuts through each of the blank or transparent frames at an angle of 90° with respect to the edges of each convolution. FIG. 5 shows more clearly that the slot 21 runs at an angle through each of the blank frames 90 through 93 which is perpendicular to the sides of the convolutions 30 through 45. The knife 51 is guided by the slot 21 so that the cutting edge passes through each of the blank frames 90 through 93 at an angle of 90° with respect to the side edges of the respective convolutions 30 through 33. The result is a rectangular matrix array of frames as shown in FIG. 6. The transparent tab 100 in FIG. 6 is removed by cutting along the line 101, and the tab 102 in FIG. 6 is removed by cutting along the line 103. The tab 100 in FIG. 6 is the crosshatched portion 100 of the blank frame 90 in FIG. 5. The tab 102 in FIG. 6 is the righthand portion of the blank frame 104 in FIG. 4.

Figure 7:
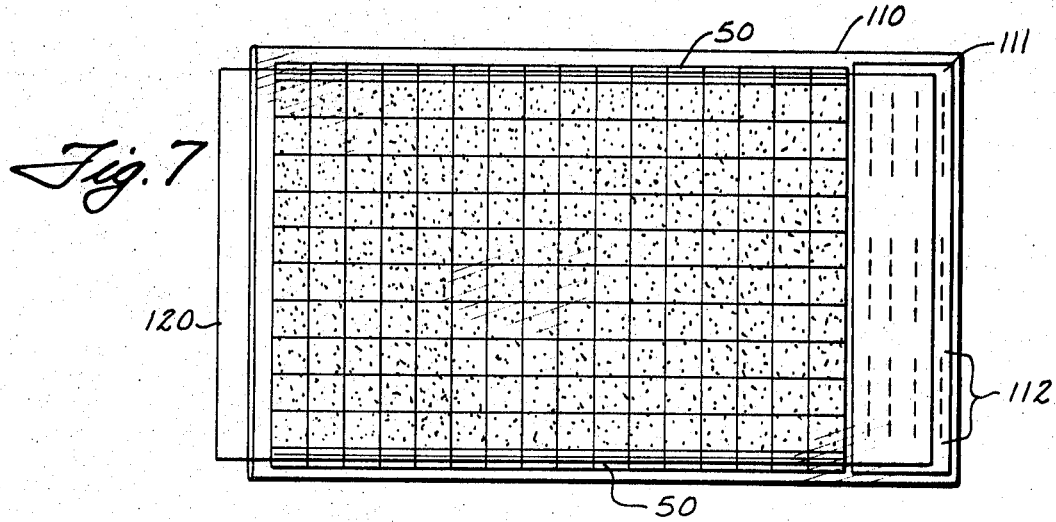
FIG. 7 illustrates the rectangular matrix array of photographic frames disposed in an envelope with an index header and a photosensitive card or plate for making a fiche copy.

Next the matrix array of photographic frames in FIG. 6 is placed in a transparent envelope 110 along with an index header 111 in the manner shown in FIG. 7. The index header 111 has indicia recorded thereon which is used to identify the location of information recorded on the various photographic frames in the rectangular matrix array. For example, the indicia designated by the reference number 112 may be employed to indicate the nature of the data stored in column 45, for example. The remaining indicia may be employed to identify information stored in the remaining columns 30 through 44 of the matrix array.

Figure 8:
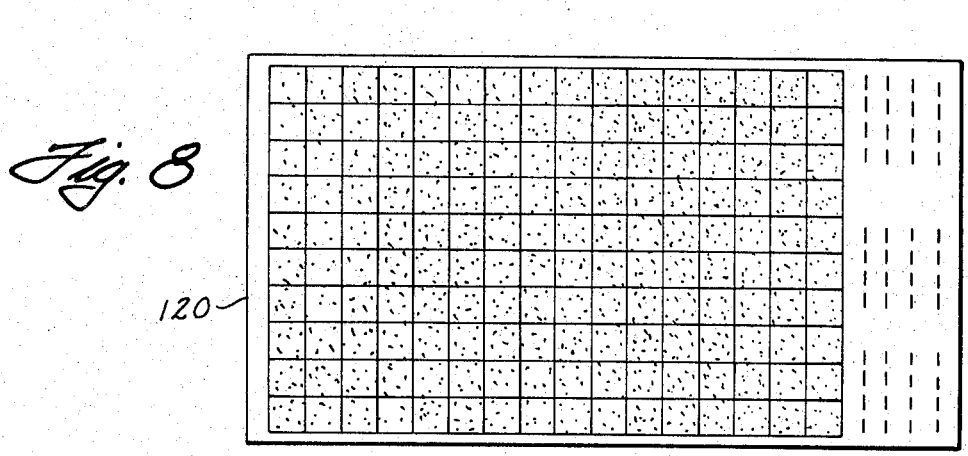
FIG. 8 illustrates the resulting fiche copy on the developed photo-sensitive card or plate.

A photosensitive plate or card 120 is inserted in the transparent envelope 110 behind the matrix array and the indicia header 111. The photosensitive plate or card 120 is shown partially removed from the transparent envelope 110. An image of the matrix array and the indicia header is made on the photosensitive plate 120. After the plate 120 is processed, a fiche copy is produced as shown in FIG. 8. The fiche copy includes an image of the rectangular matrix array and the indicia header of FIG. 7. The indicia in FIG. 8 is useful in locating information in the rectangular matrix array when it is employed in the image viewer 13 in FIG. 1. The index information, unlike the information recorded in the frames of the rectangular matrix array, is not reduced in size, and it may be read by the naked eye. The photographic images in the rectangular matrix array, on the other hand, are so small as to be difficult, if not impossible, to read with the naked eye because a reduction ratio of 42:1 is used by the camera 10 as pointed out above.

The novel method according to this invention for making a rectangular array of photographic frames from a strip film may be summarized as including the following steps;

1. exposing a series of frames on a film strip,
2. leaving blank areas at predetermined locations on the film strip,
3. processing the film strip to produce image transparencies thereon,
4. winding the film strip on a cylinder to form adjacent convolutions with the blank areas aligned,
5. securing the blank areas together,
6. cutting the film strip on the cylinder through all of the blank areas at an angle of 90° with respect to the longitudinal axis of the film strip whereby a rectangular matrix of photographic frames is formed,
7. placing indicia adjacent to the rectangular matrix array of photographic frames, and
8. making a photographic transparency of the indicia and the rectangular array of photographic frames thereby to produce a fiche copy.

Figure 9:
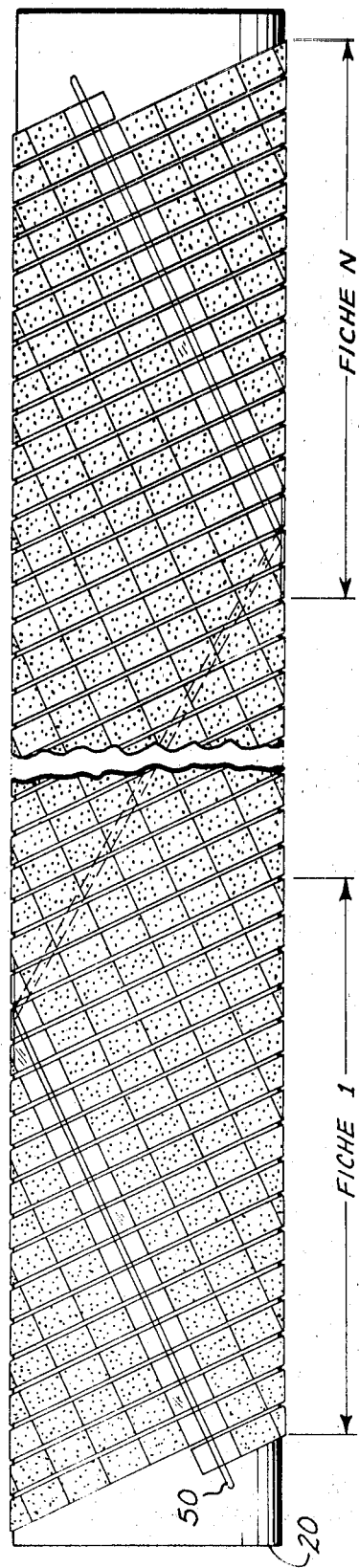
FIG. 9 illustrates a cylinder on which a plurality of fiches are wound by one continuous winding operation.

The novel method according to this invention has been illustrated for making a single rectangular fiche. The method may be practiced, however, with a longer drum to make a plurality of fiches at a time. This is technique illustrated in FIG. 9. The drum 20 is extended to the desired length so that fiches 1 through N may be wound continuously on the drum. The slot 50 is skewed around the peripheral surface of the drum as shown, and it runs at an angle of 90° with respect to the convolutions of the strip film. The slot 50 is a continuous slot which circumvolutes the drum a plurality of times depending upon the length of the drum. The adhesive tape is applied over the entire length of the slot as before, and the strip film is cut likewise at an angle of 90° with respect to the side edges of each convolution. The strip film is removed, and the tabs such as 100 and 102 in FIG. 6 are removed to form a rectangular array of frames. The resulting rectangular array contains a plurality of fiches. Each fiche of sixteen columns is cut from the large rectangular array; a header with indicia is placed adjacent each fiche as shown in FIG. 7; and a phototransparency is made to produce a fiche copy as shown in FIG. 8. By using a long cylinder, as illustrated in FIG. 9, an entire cartridge of Super 8 film 50 feet in length may be converted into ten fiches in one winding operation where each fiche has sixteen columns with ten exposed frames in each column plus a blank or unexposed frame.

It is appropriate next to discuss the parameters involved so that the size of the cylinder 20 may be determined for given parameters of the photographic matrix array in FIG. 6. The parameters are defined in Table 1 below.

TABLE 1

$C$ = circumference of cylinder 20.
$D$ = diameter of cylinder 20.
$H$ = length of each column in the photographic matrix in FIG. 6.
$V$ = distance from center to center of adjacent columns in the photographic matrix in FIG. 6.
$T$ = distance from center to center of adjacent turns on the cylinder 20 measured along the longitudinal axis of the cylinder.
$L$ = length of drum on which film is wound.
$a$ = skew angle.
$W$ = number of turns of strip film on cylinder 20.

The quantity $H$ is defined as the length of each column in the photographic matrix in FIG. 6 and this quantity is shown at the right in FIG. 6. The quantity $V$ is defined as the distance from center to center of adjacent columns of the photographic matrix array in FIG. 6, and this quantity is illustrated at the bottom of FIG. 6. It is illustrated by way of example as the distance from the center of column 41 to the center of the column 42. Various parameters are illustrated in FIG. 10.

Figure 10:
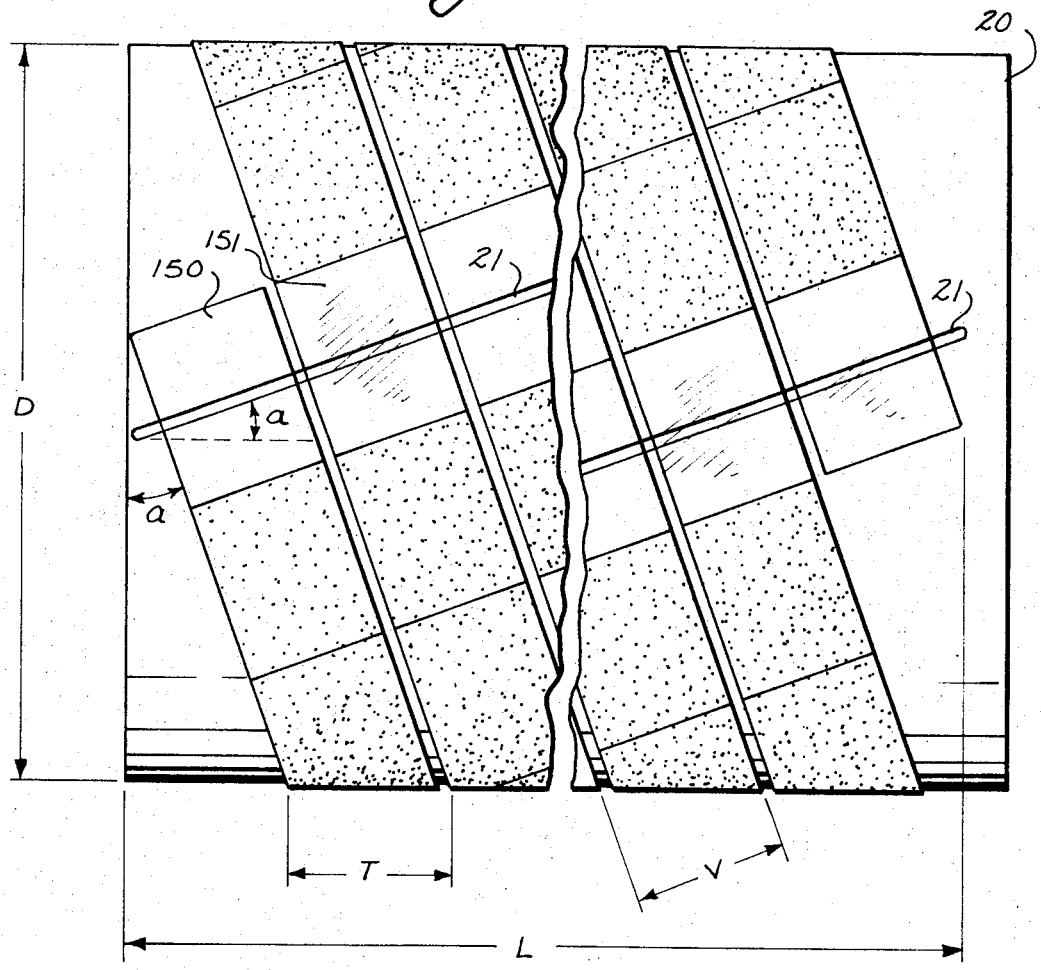
FIG. 10 is an enlarged view of a cylinder wrapped with strip film to illustrate in greater detail the parameters involved in practicing the method of this invention.
Figure 11:
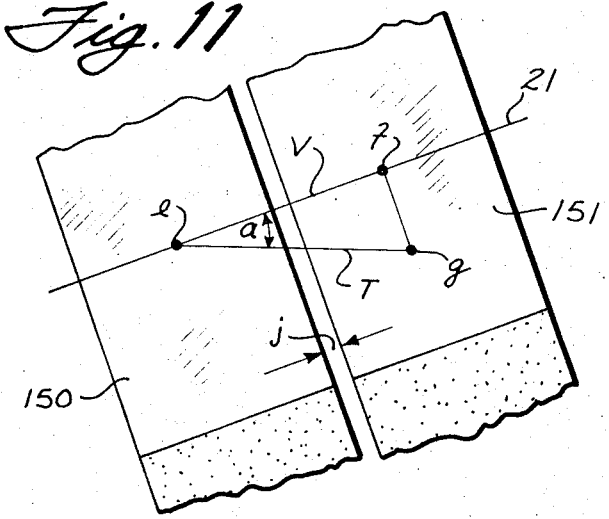
FIG. 11 is an enlarged view of a portion of FIG. 10.

Referring next to FIG. 10, the length $L$ is illustrated at the bottom of FIG. 10. The length $L$ may be termed the effective length of the wrap on the drum, and it is the length of the drum on which the film strip is wound. This length $L$ is determined by the number of turns $W$ times $T$ where $T$ is the distance from center to center of adjacent turns on the cylinder 20 measured along the longitudinal axis of the cylinder. The distance $T$ is illustrated in FIG. 11 which is an enlarged view of the transparent or blank frames 150 and 151 in FIG. 10. The distance $T$ in FIG. 11 is the hypothenuse eg of the right triangle $efg$. The quantity $V$ is illustrated again in FIG. 11, and it the side ef of the right triangle $efg$. The quantity $V$ is illustrated also at the bottom of FIG. 10. The quantities $V$ and $T$, it is pointed out, include the width of the gap $j$, and this is illustrated more precisely in FIGS. 10 and 11. The skew angle of the slot 21 on the cylinder 20 is illustrated in FIGS. 10 and 11 as the angle $a$, and this angle is defined by the sides $V$ and $T$ of the right triangle $efg$.

Figure 12:
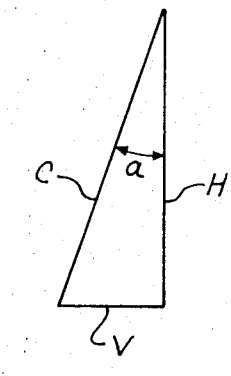
FIG. 12 is a diagram useful in explaining the relationship of various parameters involved in a winding operation according to this invention.

FIG. 12 illustrates the relationship of the quantities $H$, $V$, and $C$. The angle $a$ is defined by the sides $C$ and $H$. It is pointed out that the circumference $C$ of the cylinder 20 is greater than the length of a column $H$. It is this difference which causes the transparent or skipped frames of successive turns of the strip film to follow the slot 20 in FIG. 9 in its helical pattern around the cylinder.

Shown below in Table 2 are the mathematical relationships of the various parameters illustrated in FIGS. 10 through 12. The quantities in the righthand portion of each equation are defined in terms of $H$, $V$, and the skew angle $a$ in all cases except for the length $L$.

TABLE 2

1. $a = \text{Arctan } V/H$
2. $C = \pi D = \sqrt{H^2 + V^2}$
3. $D = C/2\pi = \sqrt{H^2 + V^2}/2\pi$
4. $T = V \sec a = V \sqrt{1 + V^2}/H$
5. $L = WT$
6. $H = C \cos a$
7. $V = H \tan n\, a$ It can be seen from FIG. 12 that the skew angle $a$ in Equation (1) is the arc tangent of the quantity $(V/H)$. The circumference $C$ in Equation (2) is the hypothenuse of the right triangle in FIG. 12, and it is readily seen that the circumference is the square root of the quantity $H^2$ plus $V^2$. This quantity divided by the value 211 yields the diameter $D$ in Equation (3). From the triangle efg in FIG. 11 it is readily seen that the quantity T in Equation (4) is defined by $V \sec a$. By defining $a$ in terms of the quantities in FIG. 12 and substituting for $\sec a$ in Equation (4), the quantity $T$ can be defined as $V \sqrt{1 + V^2}/H$. The length $L$ in Equation (5) is the number of turns $W$ times the quantity $T$. The value $H$ in Equation (6) and the value $V$ in Equation (7) readily can be determined from FIG. 12. If the parameters of a matrix array of photographs, such as illustrated in FIG. 6, are first defined, then the dimensions of the drum 20 and the angle of the slot 21 readily may be determined from the foregoing equations.

It is pointed out that the edges of the film strip wrapped around the drum 20 in FIG. 9 form a right helix, and the cutting path runs in a direction around the surface of the cylinder which forms a left helix. The left helix and the right helix thus formed intersect each other orthogonally throughout the length $L$ of the drum. Thus two families of orthogonal helices may be defined on the cylindrical surface of the drum 20 for the purpose of wrapping and cutting rectangular matrices from a strip film according to this invention.

The left helical path defined by the slot 50 in FIG. 9 represents one simple method for guiding a blade in a helical path for cutting the convolutions of strip film on the cylinder 20. It is pointed out, however, that other techniques may be employed. For example, the slot may be eliminated entirely, and a line following the same helical path may be drawn on the surface of the cylinder 20. Such line easily is visible through the transparent frames, and a blade may be manipulated by hand to cut the convolutions of strip film along such line with the blade pressed against the cylindrical surface of the drum 20. As another alternative, the slot and the line may be eliminated, and a blade may be held against the surface of the drum by a mechanism which advances the blade on the surface of the drum along a helical path identical to that of the slot or the line.

The novel method steps of this invention may be carried out as explained above to convert strip film to fiches efficiently and rapidly with a consequent reduction in the cost of labor. The frames of a row of 8 millimeter film may be exposed with inexpensive photographic camera equipment. Since the cost of equipment and labor is reduced, a fiche produced according to this invention is relatively inexpensive.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A method of making an array of photographic frames from a strip of film having photographic image frames thereon with unexposed frames periodically interspersed among the image frames on said strip of film, the method comprising the steps of:
    1. winding the strip of film on the outer surface of a cylinder to form adjacent circumvolutions of the strip of film with the unexposed frames in alignment and with the circumvolutions disposed in a skewed fashion at an angle ($a$) on the outer surface of the cylinder where the angle $a$ is measured from a plane perpendicular with the outer surface of the cylinder to the edge of the strip of film,
    2. securing the unexposed frames in place, and
    3. cutting the circumvolutions of the strip of film along a path running through the aligned unexposed frames on the outer surface of the cylinder in a skewed fashion which path runs at an angle (a) on the outer surface of the cylinder where the angle (a) in this case is measured from a line on the outer surface of the cylinder which runs parallel to the longitudinal axis of the cylinder to the cutting path whereby the cutting takes place at an angle of 90° with respect to the side edges of the unexposed frame of each circumvolution of the strip of film thereby to form a matrix of photographic frames disposed in columns and rows with the matrix having the form of a rectangle.

2. A method of recording and storing photographed images in frames on a film strip, said method comprising the steps of:
 1. exposing a series of image areas on frames of the film strip,
 2. providing given areas at predetermined spaced locations along the length of the film strip,
 3. processing the film strip to produce image transparencies in the frames thereon,
 4. winding the film strip on a cylinder to form adjacent convolutions with said given areas aligned,
 5. securing said given areas to one another, and
 6. cutting the film strip through all of said given areas at an angle of 90° with respect to the film strip thereby to form a rectangular matrix of frames with image areas.

3. The method of claim 2 further including the steps of adding indicia to the rectangular matrix of frames and copying the rectangular matrix and the indicia to provide a photographic transparency thereof.

4. A method of producing a rectangular matrix of photographic frames having image areas comprising the steps of:
 1. exposing a series of image areas on frames of a film strip,
 2. providing given areas at spaced locations along the length of the film strip,
 3. processing the film strip to produce image transparencies in the frames thereon,
 4. arranging the film strip in the form of a helix with said given areas aligned,
 5. securing said given areas together, and
 6. cutting the film strip through all of the said given areas at an angle of 90° with respect to the side edges of the film strip,
 whereby a rectangular matrix of frames with image areas is formed.

5. The method of producing a rectangular matrix of photographic frames having image areas comprising the steps of:
 1. exposing a series of image areas on frames of a film strip,
 2. providing given areas at predetermined spaced locations along the length of the film strip,
 3. processing the film strip to produce image transparencies in the frames thereon,
 4. arranging the film strip in the form of a helix with said given areas aligned,
 5. securing said given areas together, and
 6. cutting the film strip through all of said given areas at an angle of 90° with respect to the film strip, thereby to form a rectangular matrix of photographic frames which has a plurality of fiches, and
 7. dividing the rectangular matrix array of photographic frames into a plurality of smaller matrices with each small matrix being a single fiche.

6. The method of claim 5 further including the steps of adding indicia to each small matrix for the purpose of identifying the location of photographic information stored in the various frames, and copying each small matrix and its associated indicia to provide a photographic transparency.

7. The method of recording and storing photographic information in frames on a film strip, said method comprising the steps of:
 1. exposing a series of image areas on frames of the film strip,
 2. providing given areas at predetermined spaced locations along the length of the film strip,
 3. processing the film strip to produce image transparencies in the frames thereon,
 4. winding the film strip on a right cylinder to form a helix composed of adjacent convolutions of the film strip with said given areas aligned on the surface of the right cylinder,
 5. fastening said given areas to one another by placing a transparent adhesive strip over the blank areas, and
 6. cutting the film strip and the transparent adhesive strip through all of said given areas at an angle of 90° with respect to the side edges of the film strip thereby to form a rectangular matrix of frames with image areas.

8. The method of claim 7 further including the steps of adding to the rectangular matrix of frames indicia which identifies the location of information in the photographic frames, and copying the rectangular matrix of photographic frames and the indicia to provide a photographic transparency.

9. The method of claim 4 wherein step 6 is performed by cutting the film strip with a blade guided by a slot in the surface of the drum which runs at a skewed angle and intersects the side edges of said given areas at an angle of 90°.

10. A method of making an array of photographic frames from a strip of film having photographic images in frames thereon with given areas not used for photographic storage positioned at predetermined spaced intervals along said strip of film, the method comprising the steps of:
 1. winding the strip of film in the form of a helix with said given areas in alignment,
 2. securing said given areas in place, and
 3. cutting the film strip through said given aligned areas at an angle of 90° with respect to the side edges of the film strip thereby to form a matrix of photographic images in frames with the matrix having the form of a rectangle.

11. The method of claim 10 wherein step 1 is carried out by winding the film strip on a cylinder with successive convolutions forming the helix.

12. A method of making an array of photographic frames from a processed strip of film having photographic images in frames thereon with given frames positioned at predetermined spaced locations on said strip of film, the method comprising the steps of:
 1. circumvoluting the strip of film on the outer surface of a cylinder with the edges of successive convolutions forming a helix with said given frames in alignment, 2. securing said given frames in place, and
3. cutting the film strip through said aligned given frames at an angle of 90° with respect to the side edges of each convolution of the film strip thereby to form a matrix of photographic images in frames with the matrix having the form of a rectangle.

13. A method of making an array of photographic frames from a strip of film having photographic images in frames thereon with given frames separated from one another by a given distance on said strip of film, the method comprising the steps of:
1. winding the strip of film on a cylinder to form adjacent circumvolutions of the strip of film with said given frames in alignment at a skewed angle with respect to the surface of the cylinder,
2. securing the said given frames in place, and
3. cutting the strip of film on the cylinder at a skewed angle with respect to the surface of the cylinder through said aligned given frames with the cutting being at an angle of 90° with respect to the side edges of said given frame of each circumvolution of the film strip thereby to form a matrix of photographic frames disposed in columns and rows with the matrix having the form of a rectangle.

14. A method of recording and storing photographed images in frames on a film strip, said method comprising the steps of:
1. exposing a series of image areas on frames of the film strip,
2. providing given areas at predetermined spaced locations doing the length of the film strip,
3. processing the film strip to produce image transparencies in the frames thereon,
4. wrapping the film strip on a cylindrical surface to form adjacent convolutions with said given areas aligned and with the edges of the film strip defining a right helix,
5. securing said given areas to one another, and
6. cutting the film strip on the cylindrical surface through all of said given areas at an angle of 90° with respect to the longitudinal axis of the film strip along a path defining a left helix thereby to form a rectangular matrix of frames with image areas.

15. The method of claim 14 wherein the wrapping in step (4) is done with the film strip to generate a left helix by the edges of the film strip on the cylindrical surface and the cutting in step (6) is done along a path defining a right helix.

16. A method of recording and storing photographed images in frames on a film strip, said method comprising the steps of:
1. exposing a series of image areas on frames of the film strip,
2. providing given areas at predetermined spaced locations along the film strip,
3. processing the film strip to produce image transparencies in the frames thereon,
4. wrapping the film strip on a cylindrical surface to form adjacent convolutions with said given areas aligned and with the edges of the film strip defining a right helix,
5. securing the blank areas to one another, and
6. cutting the film strip on the cylindrical surface through all of said given areas along a path defining a left helix with the left helix being orthogonal to the right helix thereby to form a rectangular matrix of frames with image areas.

17. The method of claim 16 wherein the wrapping in step (4) is done with the film strip to generate a left helix by the edges of the film strip on the cylindrical surface and the cutting in step (6) is done along a path defining a right helix.

18. A method of making an array of photographic frames from a strip of film having photographic image frames thereon with given frames periodically interspersed among the image frames on said strip of film, the method comprising the steps of:
1. winding the strip of film on the outer surface of a cylinder to form adjacent circumvolutions of the strip of film with said given frames in alignment and with the circumvolutions disposed in a skewed fashion at an angle ($a$) on the outer surface of the cylinder where the angle ($a$) is measured from a plane perpendicular with the outer surface of the cylinder to the edge of the strip of film,
2. securing said given frames in place, and
3. cutting the circumvolutions of the strip of film along a path running through said aligned given frames on the outer surface of the cylinder in a skewed fashion which path runs at an angle ($a$) on the outer surface of the cylinder where the angle ($a$) in this case is measured from a line on the outer surface of the cylinder which runs parallel to the longitudinal axis of the cylinder to the cutting path whereby the cutting takes place at an angle of 90° with respect to the side edges of said given frame of each circumvolution of the strip of film thereby to form a matrix of photographic frames disposed in columns and rows with the matrix having the form of a rectangle.

* * * * *